United States Patent
Ohno (10) Patent No.: US 6,308,012 B1
(45) Date of Patent: Oct. 23, 2001

(54) TWO-FOCUS SWITCHABLE LENS

(75) Inventor: Kazunori Ohno, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/527,581

(22) Filed: Mar. 17, 2000

(30) Foreign Application Priority Data

Mar. 29, 1999 (JP) .................................................. 11-085275

(51) Int. Cl.$^7$ .............................. G03B 9/08; G03B 17/00
(52) U.S. Cl. ............................................... 396/73; 396/452
(58) Field of Search .............................. 396/73, 494, 493, 396/483, 479, 452; 359/672

(56) References Cited

U.S. PATENT DOCUMENTS 4,176,930 * 12/1979 Imura ..................................... 396/73

OTHER PUBLICATIONS

Japanese Patent Office, Patent Abstracts of Japan, Publication No.: 09021946A, Date of Publication: Jan. 21, 1997, Application No.: 07170880, Date of Filing: Jul. 6, 1995.

Japanese Patent Office, Patent Abstracts of Japan, Publication No.: 07281092 A, Date of Publication: Oct. 27, 1995, Application No.: 06072262, Date of Filing: Apr. 11, 1994.

* cited by examiner

Primary Examiner—W. B. Perkey
(74) Attorney, Agent, or Firm—Snider & Associates; Ronald R. Snider (57) ABSTRACT

A two-focus switchable lens comprises a taking lens system selectively using a wide-angle-side lens and a telephoto-side lens having respective focal lengths different from each other; and a fixed shutter 1, disposed on an image surface side of the taking lens system, for determining an amount of exposure. The wide-angle-side lens comprises two meniscus lenses $L_1$, $L_2$ each having a concave surface directed onto the object side; whereas an aperture stop 2 for defining brightness is disposed between the lens $L_2$ and the fixed shutter 1, with a single blade configuration, positioned on the image surface side of the lens $L_2$. The telephoto-side lens comprises a single positive meniscus lens $L_1'$ having a convex surface directed onto the object side, whereas an aperture stop 2' is disposed between the lens $L_1'$ and the fixed shutter 1, with a single blade configuration, positioned on the image surface side of the lens $L_1'$. Also, a marginal luminous flux restricting mask 4 is disposed on the image surface side of the fixed shutter 1.

5 Claims, 8 Drawing Sheets

FIG.1A

EXAMPLE 1

EXAMPLE 3

FIG. 5B

FIG.6A
EXAMPLE 1
BRIGHTNESS

FIG.6B
EXAMPLE 1
IMAGE HEIGHT

FIG.6C
EXAMPLE 1
IMAGE HEIGHT

FIG.6D
EXAMPLE 1
BRIGHTNESS

FIG.6E
EXAMPLE 1
IMAGE HEIGHT

FIG.6F
EXAMPLE 1
IMAGE HEIGHT

FIG. 8A
EXAMPLE 3
BRIGHTNESS
WIDE
SPHERICAL ABBERATION
SINE CONDITION (mm)

FIG. 8B
EXAMPLE 3
IMAGE HEIGHT
CURVATURE
OF FIELD (mm)

FIG. 8C
EXAMPLE 3
IMAGE HEIGHT
DISTORTION(%)

FIG. 8D
EXAMPLE 3
BRIGHTNESS
TELE
SPHERICAL ABBERATION
SINE CONDITION (mm)

FIG. 8E
EXAMPLE 3
IMAGE HEIGHT
CURVATURE
OF FIELD (mm)

FIG. 8F
EXAMPLE 3
IMAGE HEIGHT
DISTORTION(%)

TWO-FOCUS SWITCHABLE LENS

RELATED APPLICATIONS

This application claims the priority of Japanese Patent Application No. 11-085275 filed on Mar. 29, 1999, which is incorporated herein by reference.

BACKGROUND OF THE INVENTION

1. Field of the Invention

The present invention relates to a lens system of a two-focus switching type; and, in particular, to a two-focus switchable lens which is suitable for a compact, low-cost still camera and the like.

2. Description of the Prior Art

There have recently been strong demands for taking pictures according to object positions while switching between telephoto and wide-angle modes even in compact, low-cost still cameras.

As techniques of such a kind, those disclosed in Japanese Unexamined Patent Publication Nos. 7-281092 and 9-021946 have been known. The former is of a type comprising two lenses of negative and positive ones, in which the positive lens is moved so as to change the focal length; whereas the latter is of a type in which a lens on the wide-angle side and a lens on the telephoto side are switched therebetween.

In the former, however, not only a mechanism for moving the lens is necessary, but both the total lens length and the outside diameter of the negative lens become greater, whereby it may be problematic from the viewpoint of achieving compactness.

In the latter, on the other hand, each of the wide-angle and telephoto lenses is constituted by two elements of positive and negative lenses, so that four lenses in total are necessary, thereby contradicting the demands for achieving lower cost and compactness.

Also, when a wide-angle-side lens and a telephoto-side lens are used in a switchable fashion, it is necessary to employ a configuration in which the difference between their respective aperture stop positions is reduced in order to yield a smaller shutter diameter in response to the demand for compactness. However, it has been difficult to increase the power ratio of telephoto/wide angle in a simple configuration while satisfying such a requirement.

SUMMARY OF THE INVENTION

In view of such circumstances, it is an object of the present invention to provide a simple, two-focus switchable lens which can enhance the power ratio of telephoto/wide angle even in a state with a smaller shutter diameter while satisfying demands for compactness and lower cost.

The two-focus switchable lens in accordance with a first aspect of the present invention is a two-focus switchable lens comprising a taking lens system selectively using a wide-angle-side lens and a telephoto-side lens having respective focal lengths different from each other; and a fixed shutter, disposed on an image surface side of the taking lens system, for determining an amount of exposure;

the wide-angle-side lens comprising one or two positive lenses including a positive meniscus lens having a convex surface directed onto the image surface side;

the telephoto-side lens comprising one positive meniscus lens having a convex surface directed onto an object side;

the two-focus switchable lens satisfying the following conditional expression (1):

$$1.2 < f_T/f_W < 2.1 \qquad (1)$$

where $f_W$ is the focal length of the wide-angle-side lens, and $f_T$ is the focal length of the telephoto-side lens.

This configuration defines a basic condition of the two-focus switchable lens in accordance with the present invention. In order to yield an inexpensive, simple switchable lens system having practically sufficient performances, a fixed shutter is indispensable. Also, in view of the demand for compactness, it is necessary to decrease the shutter diameter, whereas the power ratio of telephoto/wide angle is required to increase. For satisfying these contradictory requests, it is important that the wide-angle-side lens have a lens configuration with as long a back focus as possible, and that the telephoto-side lens have a lens configuration with as short a back focus as possible. Consequently, the aperture stop of the telephoto-side lens is located closer to the fixed shutter, so that the shutter diameter can decrease, thus making it possible to attain compactness and prevent the number of shutter blades from increasing, whereby the cost can be lowered.

For increasing the back focus, the wide-angle-side lens may be configured as a so-called retro-focus type in which negative and positive lenses are combined. In this case, however, barrel distortion may increase so much that curvature of field becomes greater even when an aspheric surface is formed, whereby its performances may be problematic. Therefore, the wide-angle-side lens comprises one or two positive lenses including a positive meniscus lens having a convex surface directed onto the image surface side, thereby yielding favorable performances and allowing its back focus to increase.

The telephoto-side lens, on the other hand, is constituted by one positive meniscus lens having a convex surface directed onto the object side, so as to shorten its back focus and be able to attain practically sufficient imaging performances while in a very compact configuration.

The above-mentioned conditional expression (1) defines the ratio between the respective focal lengths of the wide-angle-side lens and telephoto-side lens. Namely, functions as a telephoto/wide-angle switchable lens system may not be achieved if $f_T/f_W$ is less than the lower limit of conditional expression (1). If it exceeds the upper limit, on the other hand, then the position of the aperture stop with respect to the fixed shutter becomes farther as long as a lens system having a simple configuration is used, whereby the shutter diameter becomes so large that it may hinder the camera from achieving compactness, and a problem in terms of cost may occur.

Preferably, the wide-angle-side lens comprises an aperture stop for defining brightness, which is positioned between the wide-angle-side lens and the fixed shutter when the wide-angle-side lens is selected.

This feature is concerned with the wide-angle-side lens and specifies that the aperture stop for defining brightness is disposed behind the wide-angle-side lens. Thus, the lens system of the present invention constituted by one or two positive lenses including a positive meniscus lens having a convex surface directed onto the image surface side can effectively use an aspheric surface so as to easily prevent coma and curvature of field from deteriorating.

Preferably, in this case, the telephoto-side lens comprises an aperture stop for defining brightness, which is positioned between the telephoto-side lens and the fixed shutter when the telephoto-side lens is selected, and satisfies the following conditional expression (2):

$$0.15 < des/de < 0.36 \quad (2)$$

where des is the distance between the fixed shutter and the aperture stop on an optical axis, and de is the distance between the aperture stop and the image surface on the optical axis.

This feature is concerned with the telephoto-side lens and specifies that the aperture stop for defining brightness is disposed behind the telephoto-side lens. As a consequence, it is possible to alleviate a characteristic of the telephoto-side lens that its back focus is so long that it is too far from the fixed shutter, and coma and curvature of field can be lowered, whereby imaging performances can be made favorable.

Here, the above-mentioned conditional expression (2) defines the positional relationship between the aperture stop of the telephoto-side lens and the fixed shutter. Namely, if the lower limit of conditional expression (2) is not fulfilled, then back focus may become too short, though it is advantageous for compactness since the shutter diameter can be reduced. As a consequence, the focal length may be so short that telephoto effects become insufficient, or the aperture stop position may be so close to the fixed shutter that the outside diameter of the lens system is too large, thereby hindering compactness from being attained. If the upper limit of conditional expression (2) is exceeded, on the other hand, the shutter diameter may be so large that compactness is hindered from being attained.

The two-focus switchable lens in accordance with a second aspect of the present invention is a two-focus switchable lens comprising a taking lens system selectively using a wide-angle-side lens and a telephoto-side lens having respective focal lengths different from each other; and a fixed shutter, disposed on an image surface side of the taking lens system, for determining an amount of exposure;

the fixed shutter being constituted by one blade, a marginal luminous flux restricting mask for correcting uneven exposure according to a time difference between respective points of time when the shutter starts opening and closing being disposed on a front side or rear side of the fixed shutter;

the marginal luminous flux restricting mask having such a shape that a position of an edge thereof in a direction perpendicular to an optical axis is set on a side where the fixed shutter starts opening and that the mask blocks light so as to correct respective amounts of exposure on the sides where the fixed shutter starts opening and closing on the image surface.

This configuration prevents, in a telephoto/wide-angle switchable lens system in which a wide-angle-side lens and a telephoto-side lens are switched therebetween on the object side of a fixed shutter, the aperture stop position in the telephoto-side lens in particular from becoming farther from the fixed shutter position and thereby increasing the shutter diameter. In the case where only one shutter blade is employed in order to attain a simple telephoto/wide-angle switchable camera at a low cost, uneven exposure may occur according to the time difference between the respective points of time when the shutter starts opening and closing, thus necessitating countermeasures.

For correcting the uneven exposure due to the time difference, the inventor has found it effective to place a marginal luminous flux restricting mask asymmetrical about the optical axis on any of the front and rear sides of the shutter. The position of an edge of the mask in a direction perpendicular to the optical axis is set to a position on the side where the fixed shutter starts opening, such that the difference in amount of exposure (light quantity×exposure time) between the respective sides where the fixed shutter starts opening and closing on the image surface is corrected to lower as light is blocked by the mask, and that the light quantity of the marginal luminous flux in the direction by which the shutter blade starts opening is reduced, whereby the difference in product of light quantity and exposure time between both sides is lowered.

As a consequence, this configuration overcomes a problem of uneven exposure caused by the fact that the exposure amount on the side where the shutter blade starts closing is smaller than that on the side where it starts opening.

Here, since the aperture stop position of the wide-angle-side lens is closer to the fixed shutter and thus is less likely to be influenced by the above-mentioned asymmetrical marginal luminous flux restricting mask, it is free from the problem of decrease in marginal light quantity. On the other hand, the telephoto-side lens has such a large marginal light quantity that it yields a practically sufficient marginal light quantity even when shielded as mentioned above.

Preferably, in this case, the telephoto-side lens comprises an aperture stop for defining brightness, which is positioned between the telephoto-side lens and the fixed shutter when the telephoto-side lens is selected, and satisfies the above-mentioned conditional expression (2).

As mentioned above, when the marginal luminous flux restricting mask is disposed on any of the front and rear sides of the fixed shutter, then uneven exposure can be prevented from occurring, and the focal length of the telephoto-side lens can be enhanced. If this focal length is too large, however, the lens outside diameter and the like become so large that they hinder compactness from being attained. The above-mentioned feature represents a restriction therefor as conditional expression (2). Namely, if des/de is less than the lower limit of conditional expression (2), then back focus may become too short, though it is advantageous for compactness since the shutter diameter can be reduced. As a consequence, the focal length may be so short that telephoto effects become insufficient, or the aperture stop position may be so close to the fixed shutter that the outside diameter of the lens system is so large, thereby hindering compactness from being attained. If the upper limit of conditional expression (2) is exceeded, on the other hand, the shutter diameter may be so large that compactness is hindered from being attained.

DESCRIPTION OF THE PREFERRED EMBODIMENTS

In the following, embodiments of the present invention will be explained with reference to the accompanying drawings.

EXAMPLE 1

Figure 1A:
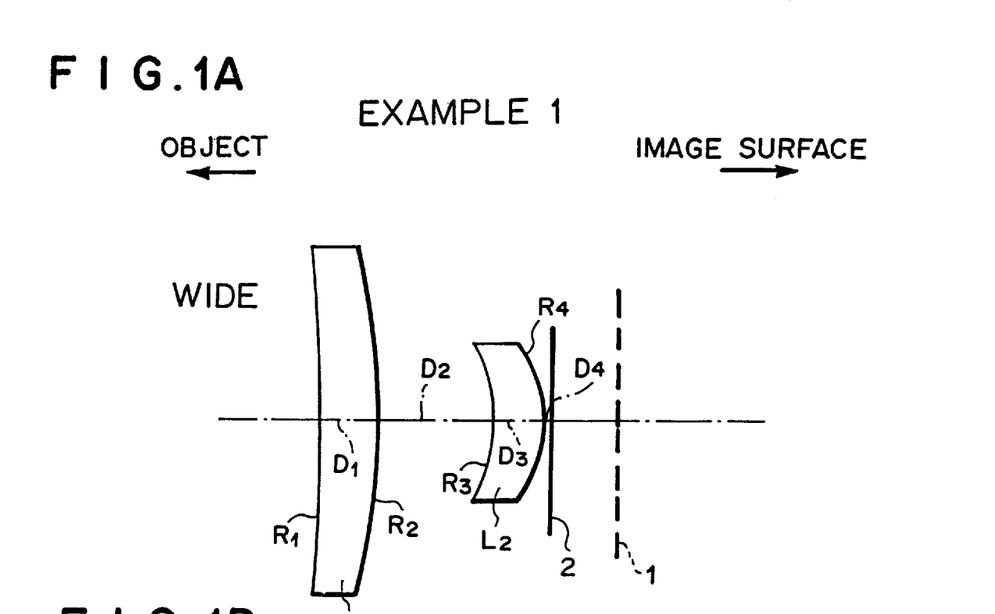
FIGS. 1A and 1B are schematic views showing a basic configuration of the two-focus switchable lens in accordance with Example 1 of the present invention.
Figure 1B:
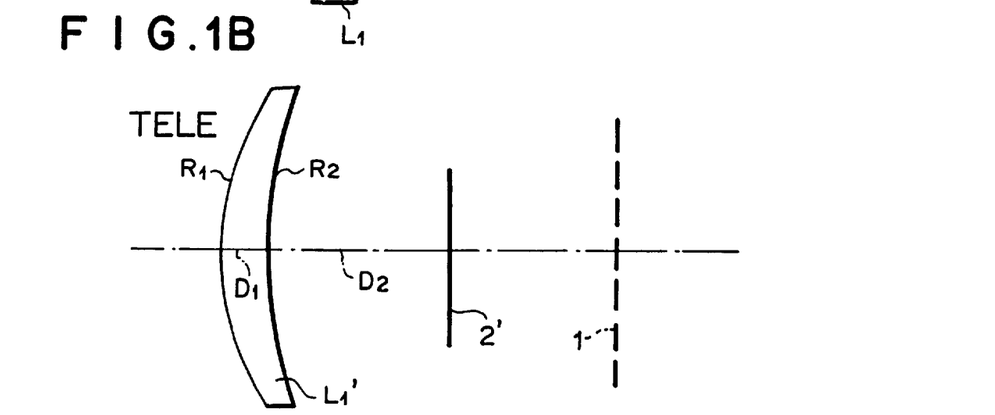

FIGS. 1A and 1B show respective lens configurations of a wide-angle-side lens (WIDE) and a telephoto-side lens (TELE) in the two-focus switchable lens in accordance with Example 1. One of these two lenses is selectively set at a taking lens position in response to a lens switching operation effected by a user of a camera.

The wide-angle-side lens comprises two meniscus lenses $L_1$, $L_2$ each having a concave surface directed onto the object side; whereas an aperture stop 2 for defining brightness is disposed between the lens $L_2$ and a fixed shutter 1, with a single blade configuration, positioned on the image surface side of the lens $L_2$.

On the other hand, the telephoto-side lens comprises a single positive meniscus lens $L_1'$ having a convex surface directed onto the object side, whereas an aperture stop 2' is disposed between the lens $L_1'$ and the fixed shutter 1, with a single blade configuration, positioned on the image surface side of the lens $L_1'$.

In a telephoto/wide-angle switching operation, the wide-angle-side lens comprising the positive meniscus lenses $L_1$, $L_2$ and the aperture stop 2, and the telephoto-side lens comprising the positive meniscus lens $L_1'$ and the aperture stop 2' are switched therebetween.

Figure 2A:
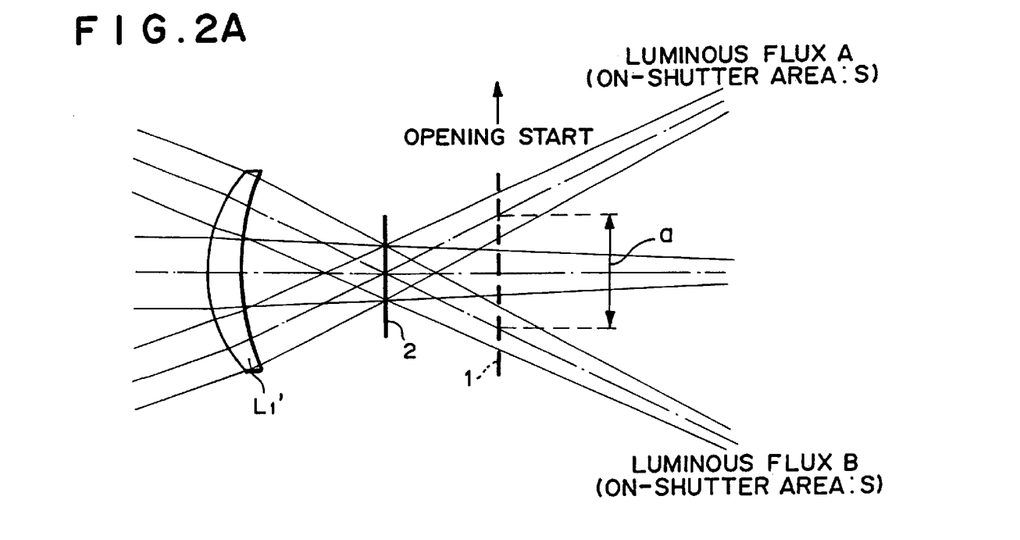
FIGS. 2A and 2B are views for explaining operations of the two-focus switchable lens in accordance with Example 1 of the present invention.
Figure 2B:
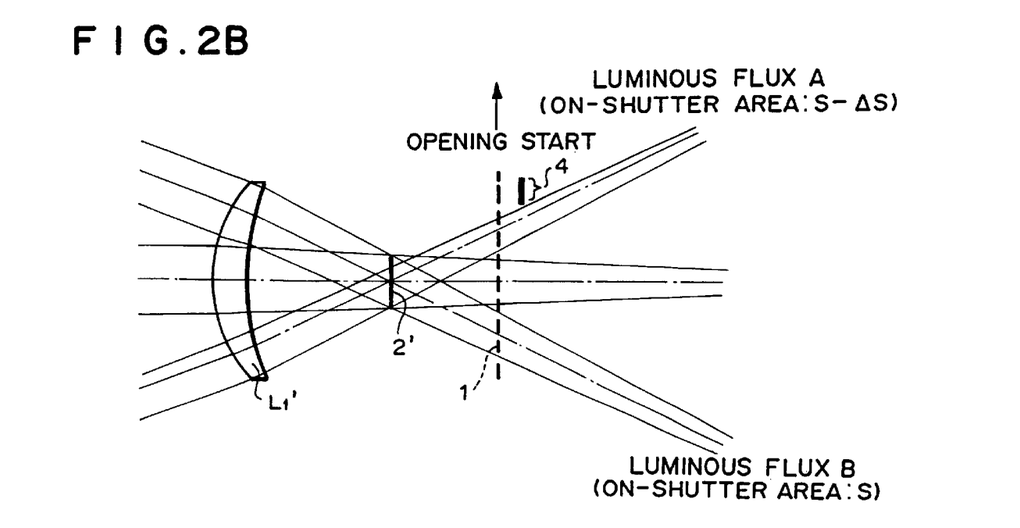

In this example, a marginal luminous flux restricting mask 4 shown in FIG. 2B is disposed on the image surface side of the fixed shutter 1. It is provided because of the following reasons.

Namely, if such a marginal luminous flux restricting mask 4 is not provided, as shown in FIG. 2A, unevenness in exposure occurs on the image surface according to a time difference between respective points of time when the fixed shutter 1 starts opening and closing, since the fixed shutter 1 is constituted by a single blade. In particular, as the focal length of the telephoto-side lens increases (thereby enhancing the power ratio), the aperture stop 2' is located farther from the fixed shutter 1, whereby the degree of uneven exposure becomes greater.

That is, letting a be the difference in height of principal ray between luminous fluxes A and B on the fixed shutter 1, and K be the opening/closing speed of the shutter blade, the difference in average exposure time between the luminous fluxes A and B becomes 2a/K, so that the exposure time of the luminous flux A is longer by this difference. As a consequence, assuming that the luminous fluxes A and B have the same quantity of light per unit, unevenness in exposure occurs on the image surface irradiated thereby.

Therefore, in this example, the marginal luminous flux restricting mask 4 is disposed on the side where the fixed shutter 1 starts opening, and the quantity of light is adjusted, such that the total exposure amount (light quantity×exposure time) in the luminous flux A and that in the luminous flux B substantially equal each other, thereby preventing unevenness in exposure from occurring on the image surface. As a consequence, the power ratio of telephoto/wide angle can be enhanced.

Here, as the focal length of the telephoto-side lens increases, the aperture stop 2' is located farther from the fixed shutter 1, whereby the degree of unevenness in exposure becomes greater since a in FIG. 2A increases.

Figure 3:
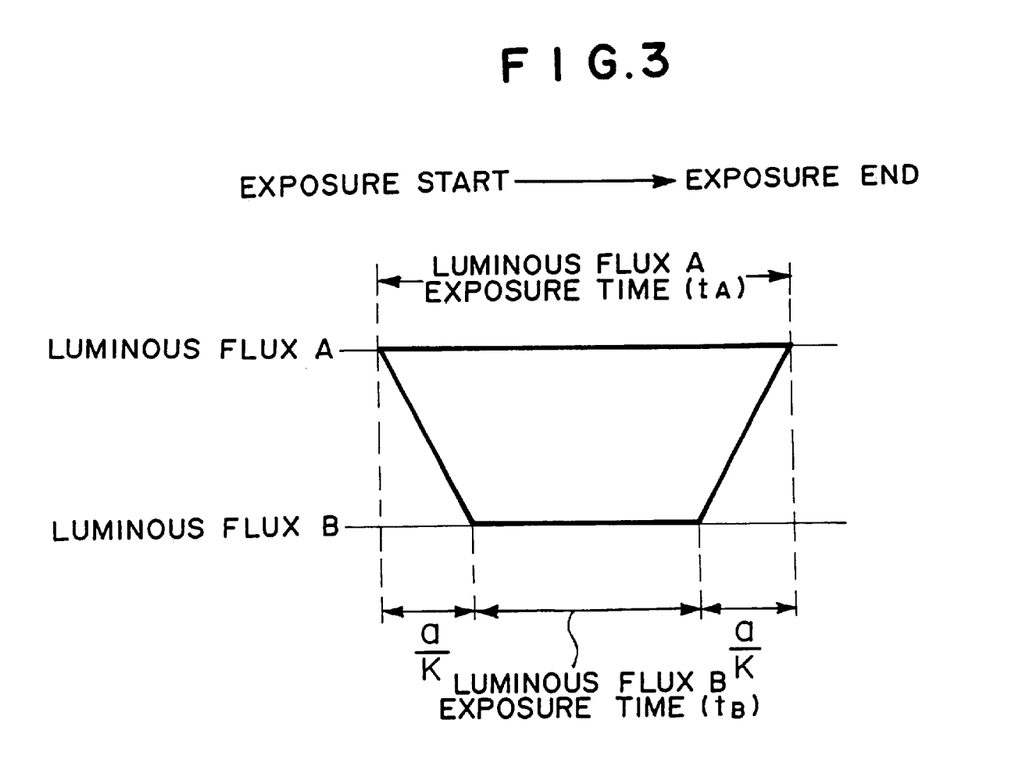
FIG. 3 is a view for explaining operations of the two-focus switchable lens in accordance with Example 1 of the present invention.

Also, FIG. 3 schematically represents the foregoing explanation, indicating that, since each of the exposure start time and exposure end time shifts by a/K between the luminous fluxes A and B, the exposure time ($t_B$) of the luminous flux B is shorter than the exposure time ($t_A$) of the luminous flux A by 2a/K.

The following Table 1 shows values of radius of curvature R (mm) of each lens surface, center thickness of each lens and air space between each pair of lenses D (mm), and refractive index N and Abbe number ν of each lens at d-line in the wide-angle-side lens in the two-focus switchable lens in accordance with this example. The numbers in this table successively increase from the object side, whereas the stop surface in the table indicates the position of the aperture stop 2 (the same applying to its subsequent tables as well).

The image surface is curved with a radius of curvature of −80.00 in the longitudinal direction thereof.

The surfaces marked with "*" on the right side of their R values in Table 1 are aspheric surfaces, each having an aspheric form represented by the following aspheric surface expression:

$$X = Ch/(1+\sqrt{1-kC^2h^2}) + a4h^4 + a6h^6 + a8h^8 + a10h^{10}$$

where
X is the length of the perpendicular to a tangential plane (plane perpendicular to the optical axis) of an apex of the aspheric surface from a point on the aspheric surface having a height h from the optical axis;
C is the reciprocal of the paraxial radius of curvature R of the aspheric surface;
h is the height from the optical axis;

k is the eccentricity; and a4, a6, a8, and a10 are the fourth-, sixth-, eighth-, and tenth-order aspheric surface coefficients.

The following Table 2 shows the respective values of constants C, k, a4, a6, and a10 of each aspheric surface shown in the above-mentioned aspheric surface expression.

The following Table 3 shows values of radius of curvature R (mm) of each lens surface, center thickness of each lens and air space between each pair of lenses D (mm), and refractive index N and Abbe number ν of each lens at d-line in the telephoto-side lens in the two-focus switchable lens in accordance with this example. The numbers in this table successively increase from the object side.

The image surface is curved with a radius of curvature of −80.00 in the longitudinal direction thereof.

The surface marked with "*" on the right side of its R value in Table 3 is an aspheric surface.

The following Table 4 shows the respective values of constants C, k, a4, a6, and a10 of the aspheric surface shown in the above-mentioned aspheric surface expression.

Further, the following Table 5 shows values of focal length f, F-number, angle of view 2ω, distance de between the stop and the image surface, distance des between the stop and the shutter, and des/de in the wide-angle-side lens (WIDE) and telephoto-side lens (TELE) in this example.

FIGS. 6A to 6F are aberration charts showing spherical aberration, curvature of field, and distortion in the wide-angle-side lens (WIDE) and telephoto-side lens (TELE) in the two-focus switchable lens in Example 1. In the spherical aberration charts, the solid line d and chain-dotted line g indicate spherical aberrations at d-line and g-line, respectively, whereas the broken line S.C indicates a sine condition. In the charts showing curvature of field, the solid line S and broken line T indicate curvatures of field in sagittal and tangential image surfaces, respectively.

As shown in the above-mentioned Table 5 and FIGS. 6A to 6F, it is clear that the two-focus switchable lens in accordance with Example 1 satisfies both of the above-mentioned conditional expressions (1) and (2), and that its aberrations are favorably corrected.

EXAMPLE 2

Figures 4A, 4B:
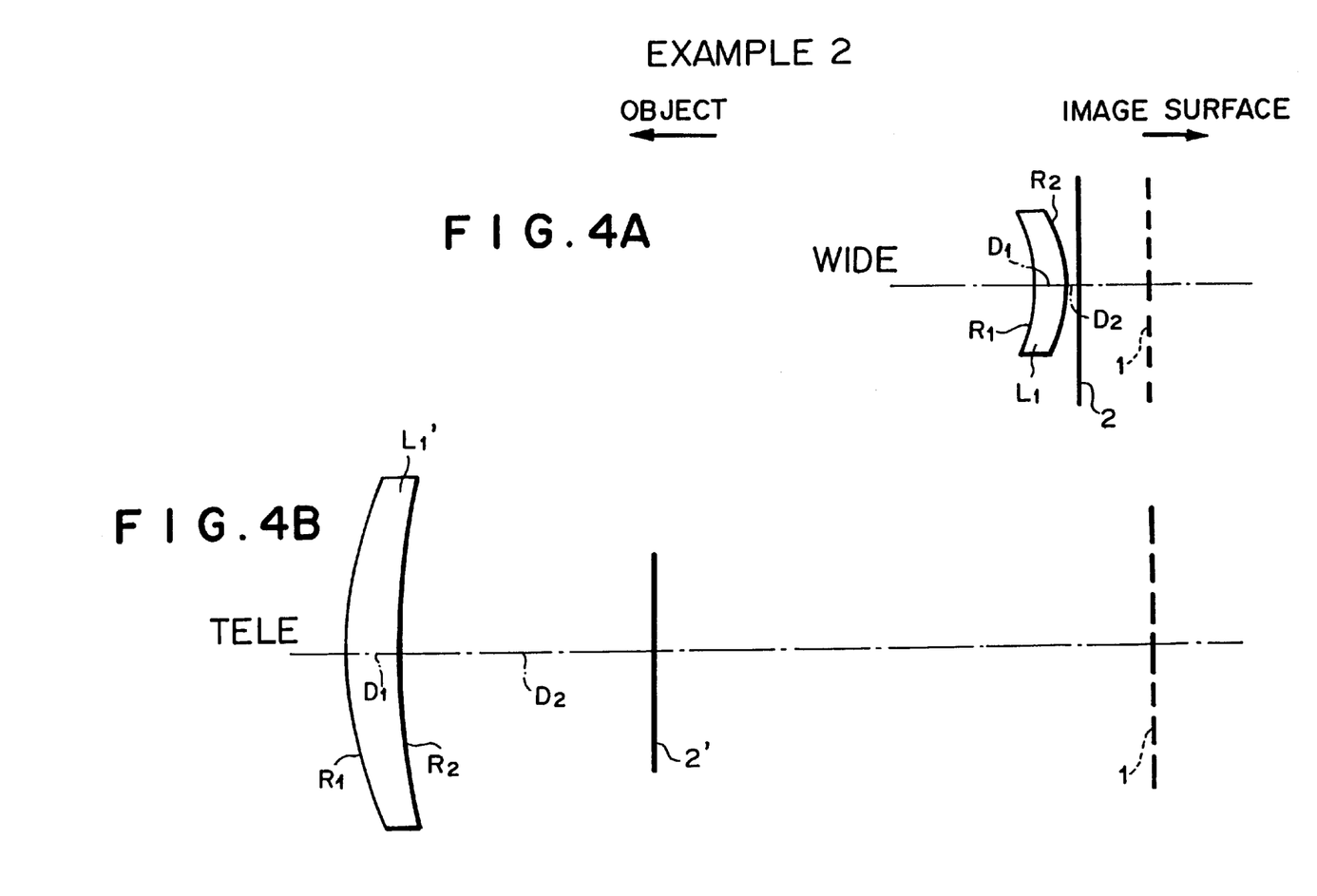
FIGS. 4A and 4B are schematic views showing a basic configuration of the two-focus switchable lens in accordance with Example 2 of the present invention.

FIGS. 4A and 4B show respective lens configurations of a wide-angle-side lens (WIDE) and a telephoto-side lens (TELE) in the two-focus switchable lens in accordance with Example 2. One of these two lenses is selectively set at a taking lens position in response to a lens switching operation effected by a user of a camera.

The two-focus switchable lens in accordance with Example 2 differs from that of the above-mentioned Example 1 in that the wide-angle-side lens (WIDE) is constituted by a single positive meniscus lens $L_1$ having a concave surface directed onto the object side.

The following Table 6 shows values of radius of curvature R (mm) of each lens surface, center thickness of each lens and air space between each pair of lenses D (mm), and refractive index N and Abbe number ν of each lens at d-line in the wide-angle-side lens in the two-focus switchable lens in accordance with this example.

The image surface is curved with a radius of curvature of −80.00 in the longitudinal direction thereof.

The surfaces marked with "*" on the right side of their R values in Table 6 are aspheric surfaces, each having an aspheric form represented by the above-mentioned aspheric surface expression.

The following Table 7 shows the respective values of constants C, k, a4, a6, and a10 of each aspheric surface shown in the above-mentioned aspheric surface expression.

The following Table 8 shows values of radius of curvature R (mm) of each lens surface, center thickness of each lens and air space between each pair of lenses D (mm), and refractive index N and Abbe number ν of each lens at d-line in the telephoto-side lens in the two-focus switchable lens in accordance with this example.

The image surface is curved with a radius of curvature of −80.00 in the longitudinal direction thereof.

Further, the following Table 9 shows values of focal length f, F-number, angle of view 2ω, distance de between the stop and the image surface, distance des between the stop and the shutter, and des/de in the wide-angle-side lens (WIDE) and telephoto-side lens (TELE) in this example.

FIGS. 7A to 7F are aberration charts showing spherical aberration, curvature of field, and distortion in the wide-angle-side lens (WIDE) and telephoto-side lens (TELE) in the two-focus switchable lens in Example 2. In the spherical aberration charts, the solid line d and chain-dotted line g indicate spherical aberrations at d-line and g-line, respectively, whereas the broken line S.C indicates a sine condition. In the charts showing curvature of field, the solid line S and broken line T indicate curvatures of field in sagittal and tangential image surfaces, respectively.

As shown in the above-mentioned Table 9 and FIGS. 7A to 7F, it is clear that the two-focus switchable lens in accordance with Example 2 satisfies both of the above-mentioned conditional expressions (1) and (2), and that its aberrations are favorably corrected.

EXAMPLE 3

Figure 5A:
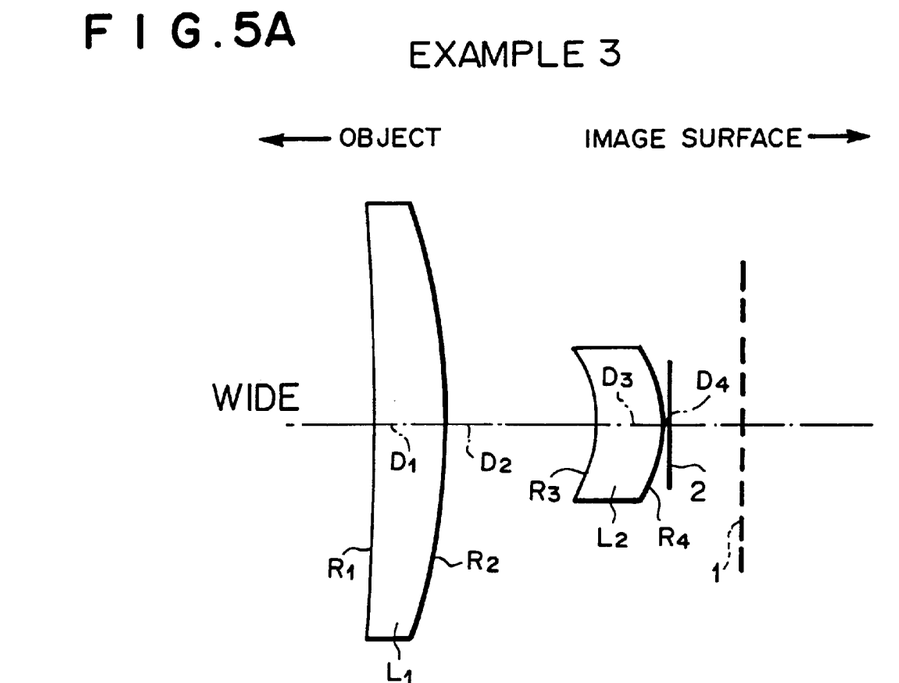
FIGS. 5A and 5B are schematic views showing a basic configuration of the two-focus switchable lens in accordance with Example 3 of the present invention.
Figure 5B:
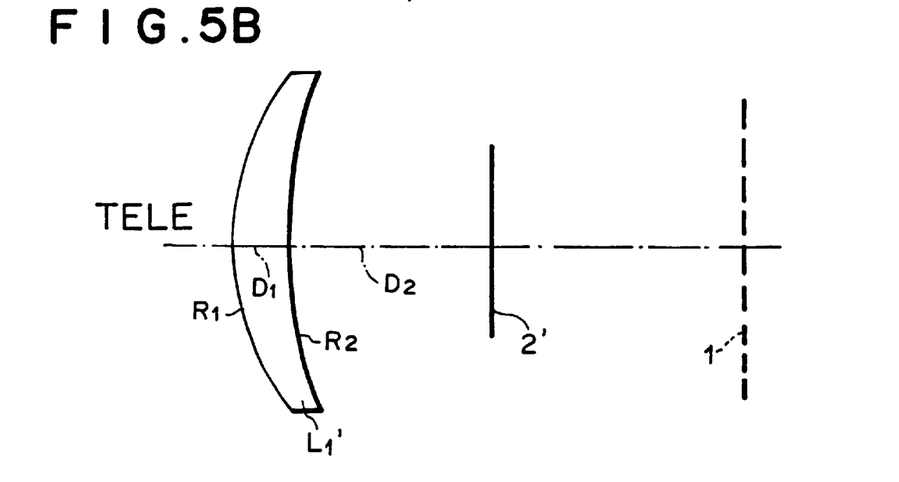
Figure 6A:
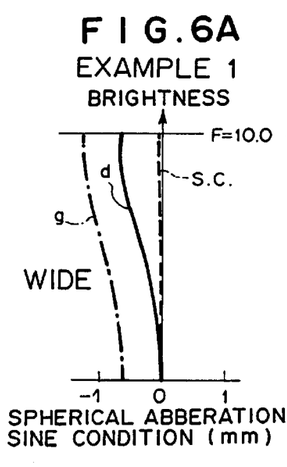
FIGS. 6A, 6B, 6C, 6D, 6E and 6F are aberration charts of the two-focus switchable lens in accordance with Example 1.
Figure 6B:
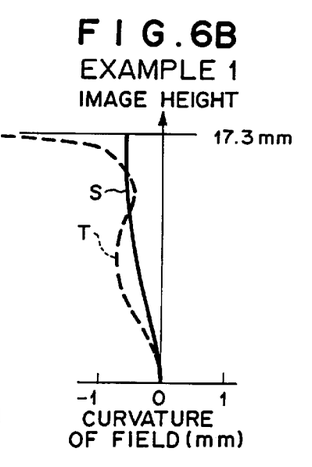
Figure 6C:
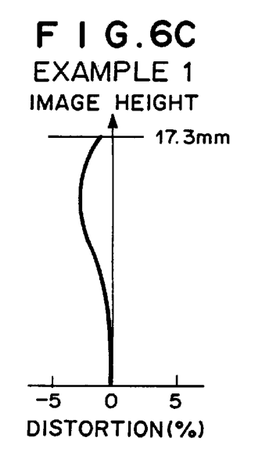
Figure 6D:
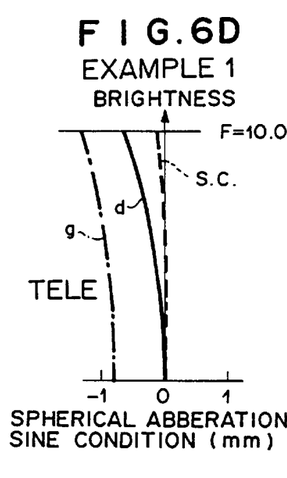
Figure 6E:
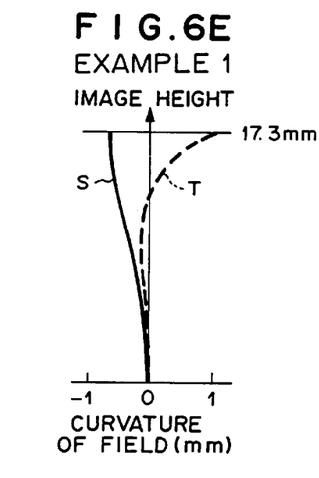
Figure 6F:
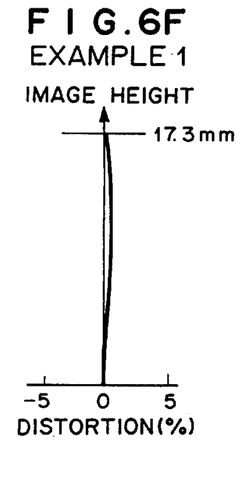
Figure 7A:
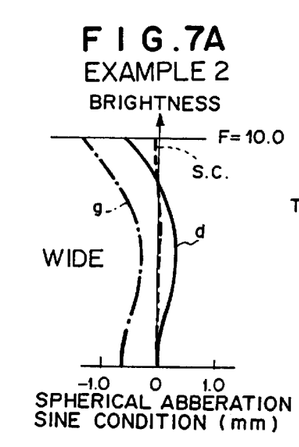
FIGS. 7A, 7B 7C, 7D, 7E and 7F are aberration charts of the two-focus switchable lens in accordance with Example 2.
Figure 7B:
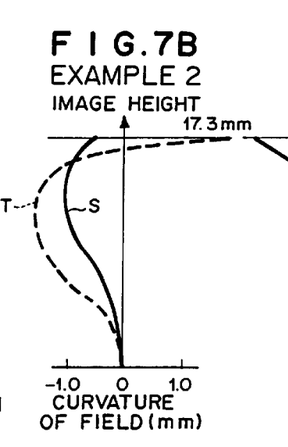
Figure 7C:
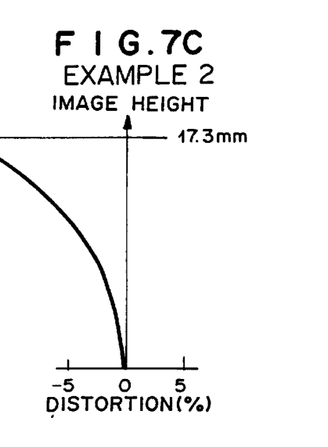
Figure 7D:
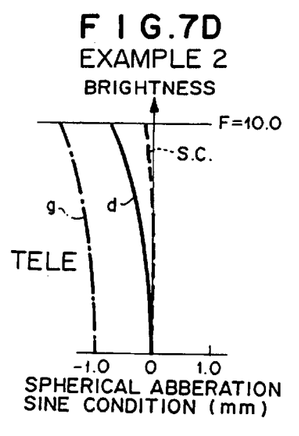
Figure 7E:
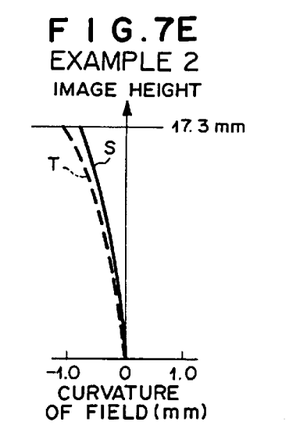
Figure 7F:
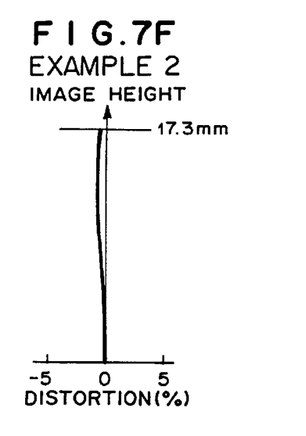
Figure 8A:
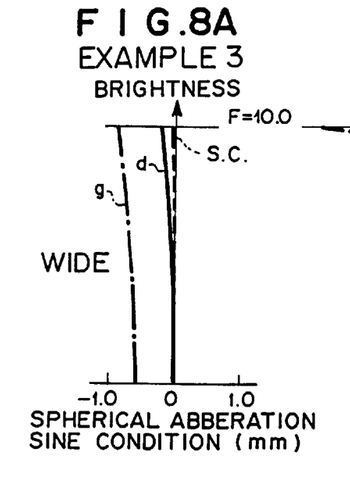
FIGS. 8A, 8B, 8C, 8D, 8E and 8F are aberration charts of the two-focus switchable lens in accordance with Example 3.
Figure 8B:
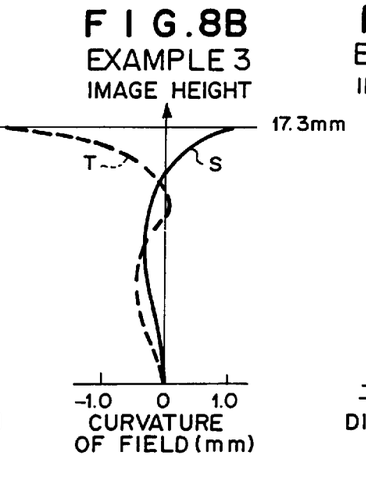
Figure 8C:
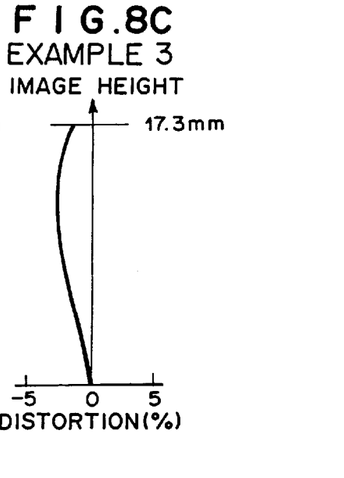
Figure 8D:
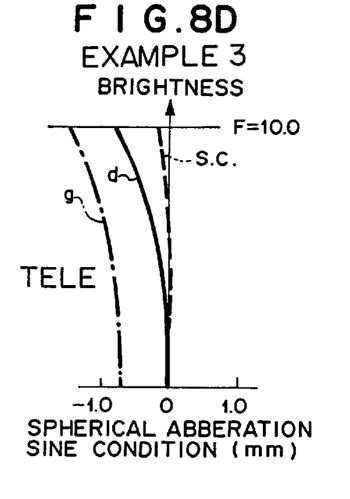
Figure 8E:
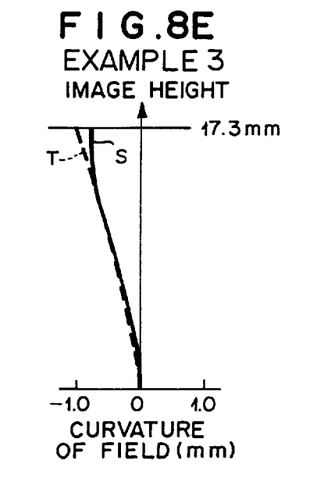
Figure 8F:
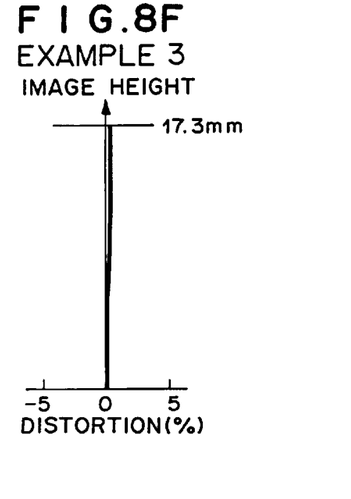

FIGS. 5A and 5B show respective lens configurations of a wide-angle-side lens (WIDE) and a telephoto-side lens (TELE) in the two-focus switchable lens in accordance with Example 3. One of these two lenses is selectively set at a taking lens position in response to a lens switching operation effected by a user of a camera.

The two-focus switchable lens in accordance with Example 3 has a lens configuration substantially the same as that of the above-mentioned Example 1.

The following Table 10 shows values of radius of curvature R (mm) of each lens surface, center thickness of each lens and air space between each pair of lenses D (mm), and refractive index N and Abbe number ν of each lens at d-line in the wide-angle-side lens in the two-focus switchable lens in accordance with this example.

The image surface is curved with a radius of curvature of −80.00 in the longitudinal direction thereof.

The surfaces marked with "*" on the right side of their R values in Table 10 are aspheric surfaces, each having an aspheric form represented by the above-mentioned aspheric surface expression.

The following Table 11 shows the respective values of constants C, k, a4, a6, and a10 of each aspheric surface shown in the above-mentioned aspheric surface expression.

The following Table 12 shows values of radius of curvature R (mm) of each lens surface, center thickness of each lens and air space between each pair of lenses D (mm), and refractive index N and Abbe number ν of each lens at d-line in the telephoto-side lens in the two-focus switchable lens in accordance with this example.

The image surface is curved with a radius of curvature of −80.00 in the longitudinal direction thereof.

Further, the following Table 13 shows values of focal length f, F-number, angle of view 2ω, distance de between the stop and the image surface, distance des between the stop and the shutter, and des/de in the wide-angle-side lens (WIDE) and telephoto-side lens (TELE) in this example.

FIGS. 8A to 8F are aberration charts showing spherical aberration, curvature of field, and distortion in the wide-angle-side lens (WIDE) and telephoto-side lens (TELE) in the two-focus switchable lens in Example 3. In the spherical aberration charts, the solid line d and chain-dotted line g indicate spherical aberrations at d-line and g-line, respectively, whereas the broken line S.C indicates a sine condition. In the charts showing curvature of field, the solid line S and broken line T indicate curvatures of field in sagittal and tangential image surfaces, respectively.

As shown in the above-mentioned Table 13 and FIGS. 8A to 8F, it is clear that the two-focus switchable lens in accordance with Example 3 satisfies both of the above-mentioned conditional expressions (1) and (2), and that its aberrations are favorably corrected.

Without being restricted to those of the above-mentioned examples, the two-focus switchable lens in accordance with the present invention can be modified in various manners. For example, the radius of curvature R and lens space (or lens thickness) D in each lens can be changed as appropriate.

Also, in the two-focus switchable lens in accordance with the present invention, the lens $L_2$ on the image surface side can be constituted by a biconvex lens as the wide-angle-side lens.

In the two-focus switchable lens in accordance with the present invention, as explained in the foregoing, the wide-angle-side lens is constituted by one or two positive lenses including a positive meniscus lens having a convex surface directed onto the image surface side, whereas the telephoto-side lens is constituted by a single positive meniscus lens, so that the total number of lenses is 3 or less, whereby demands for compactness and lower cost are satisfied. Also, the wide-angle-side lens has a lens configuration with as long a back focus as possible, whereas the telephoto-side lens has a lens configuration with as short a back focus as possible, and a predetermined conditional expression is satisfied, whereby the power ratio of telephoto/wide angle can be enhanced even in a state where the shutter diameter is made smaller.

In the case where the shutter has a single blade configuration in order to yield a simple telephoto/wide-angle switchable camera at a low cost, there has been a possibility of uneven exposure occurring according to a time difference between respective points of time when the shutter starts opening and closing. When a marginal luminous flux restricting mask asymmetrical about the optical axis is disposed on any of the front and rear sides of the shutter, the unevenness in exposure caused by the time difference is corrected, so as to prevent the aperture stop position in the telephoto-side lens from being located farther from the fixed shutter position, whereby the power ratio of telephoto/wide angle can be enhanced even in the state where the shutter diameter is made smaller.

TABLE 1

| WIDE Surface | R | D | $N_d$ | $\nu_d$ |
|---|---|---|---|---|
| 1 | −143.890* | 1.700 | 1.49023 | 57.6 |
| 2 | −20.468 | 3.520 | 1. | |
| 3 | −4.212* | 1.580 | 1.49023 | 57.6 |
| 4 | −3.906 | 0.100 | 1. | |
| 5 | stop surface | | | |

TABLE 2

| Surface | C | k | a4 | a6 | a8 | a10 |
|---|---|---|---|---|---|---|
| 1 | −6.949753 × $10^3$ | −163.2507 | −4.9889 × $10^{-5}$ | −4.4463 × $10^{-8}$ | 1.0844 × $10^{-8}$ | 5.4866 × $10^{-11}$ |
| 3 | −0.237417 | 1.389738 | 3.8013 × $10^{-4}$ | −3.9394 × $10^{-4}$ | −5.3418 × $10^{-5}$ | 3.7965 × $10^{-5}$ |

TABLE 3

| TELE Surface | R | D | $N_d$ | $\nu_d$ |
|---|---|---|---|---|
| 1 | 8.606* | 1.500 | 1.49023 | 57.6 |
| 2 | 15.726 | 6.360 | | |
| 3 | stop surface | | | |

TABLE 4

| Surface | C | k | a4 | a6 | a8 | a10 |
|---|---|---|---|---|---|---|
| 1 | 0.116198 | 0.994974 | −1.2967 × $10^{-6}$ | −1.4719 × $10^{-7}$ | −6.6345 × $10^{-9}$ | −1.8544 × $10^{-10}$ |

TABLE 5

| Item Symbol | Focal Length f' | Brightness FNO | Angle of view 2ω | Stop-image surface distance de | Stop-shutter distance des | d es/de |
|---|---|---|---|---|---|---|
| WIDE | 24.507 | 10.00 | 71.0° | 25.002 | 2.002 | 0.072 |
| TELE | 36.261 | 10.00 | 50.9° | 27.822 | 4.822 | 0.173 |

TABLE 6

| WIDE Surface | R | D | $N_d$ | $v_d$ |
|---|---|---|---|---|
| 1 | −3.791* | 0.900 | 1.49023 | 57.6 |
| 2 | −3.106* | 0.200 | 1. | |
| 3 | stop surface | | | |

TABLE 7

| Surface | C | k | a4 | a6 | a8 | a10 |
|---|---|---|---|---|---|---|
| 1 | −0.263783 | 3.69149 | $1.8553 \times 10^{-3}$ | $-5.2790 \times 10^{-4}$ | $-1.9409 \times 10^{-4}$ | $1.8024 \times 10^{-4}$ |
| 3 | −0.321956 | 1.56888 | $2.7324 \times 10^{-3}$ | $-1.6760 \times 10^{-3}$ | $-5.5923 \times 10^{-5}$ | $1.4468 \times 10^{-4}$ |

TABLE 8

| TELE Surface | R | D | $N_d$ | $v_d$ |
|---|---|---|---|---|
| 1 | 11.600 | 1.500 | 1.49023 | 57.6 |
| 2 | 22.872 | 7.690 | | |
| 3 | stop surface | | | |

TABLE 9

| Item Symbol | Focal Length f' | Brightness FNO | Angle of view 2ω | Stop-image surface distance de | Stop-shutter distance des | d es/de |
|---|---|---|---|---|---|---|
| WIDE | 24.483 | 10.00 | 78.3° | 26.195 | 2.195 | 0.084 |
| TELE | 46.000 | 10.00 | 40.9° | 36.353 | 12.353 | 0.340 |

TABLE 10

| WIDE Surface | R | D | $N_d$ | $v_d$ |
|---|---|---|---|---|
| 1 | −116.335* | 1.700 | 1.49023 | 57.6 |
| 2 | −20.283 | 3.520 | 1. | |
| 3 | −4.127* | 1.480 | 1.49023 | 57.6 |
| 4 | −3.813 | 0.100 | 1. | |
| 5 | stop surface | | | |

TABLE 11

| Surface | C | k | a4 | a6 | a8 | a10 |
|---|---|---|---|---|---|---|
| 1 | $-8.59587 \times 10^{-3}$ | 0.960550 | $-5.2853 \times 10^{-5}$ | $3.2963 \times 10^{-8}$ | $-1.8467 \times 10^{-12}$ | $-1.7772 \times 10^{-15}$ |
| 3 | −0.2423185 | 1.447843 | $-4.3539 \times 10^{-4}$ | $-1.0047 \times 10^{-4}$ | $-3.9409 \times 10^{-6}$ | $1.1281 \times 10^{-5}$ |

TABLE 12

| TELE Surface | R | D | $N_d$ | $v_d$ |
|---|---|---|---|---|
| 1 | 7.889 | 1.200 | 1.49023 | 57.6 |
| 2 | 13.875 | 5.420 | | |
| 3 | stop surface | | | |

TABLE 13

| Item Symbol | Focal Length f' | Brightness FNO | Angle of view 2ω | Stop-image surface distance de | Stop-shutter distance des | d es/de |
|---|---|---|---|---|---|---|
| WIDE | 24.501 | 10.00 | 71.4° | 24.999 | 1.999 | 0.080 |
| TELE | 34.993 | 10.00 | 52.6° | 27.822 | 4.822 | 0.173 |

What is claimed is:

1. A two-focus switchable lens comprising a taking lens system selectively using a wide-angle-side lens and a telephoto-side lens having respective focal lengths different from each other; and a fixed shutter, disposed on an image surface side of said taking lens system, for determining an amount of exposure;

said wide-angle-side lens comprising one or two positive lenses including a positive meniscus lens having a convex surface directed onto the image surface side;

said telephoto-side lens comprising one positive meniscus lens having a convex surface directed onto an object side;

said two-focus switchable lens satisfying the following conditional expression (1):

$$1.2 < f_T/f_W < 2.1 \qquad (1)$$

where $f_W$ is the focal length of said wide-angle-side lens, and $f_T$ is the focal length of said telephoto-side lens.

2. A two-focus switchable lens according to claim 1, wherein said wide-angle-side lens comprises an aperture stop for defining brightness, said aperture stop being positioned between said wide-angle-side lens and said fixed shutter when said wide-angle-side lens is selected.

3. A two-focus switchable lens according to claim 1, wherein said telephoto-side lens comprises an aperture stop for defining brightness, said aperture stop being positioned between said telephoto-side lens and said fixed shutter when said telephoto-side lens is selected, said telephoto-side lens satisfying the following conditional expression (2):

$$0.15 < des/de < 0.36 \qquad (2)$$

where des is the distance between said fixed shutter and said aperture stop on an optical axis, and de is the distance between said aperture stop and the image surface on the optical axis.

4. A two-focus switchable lens comprising a taking lens system selectively using a wide-angle-side lens and a telephoto-side lens having respective focal lengths different from each other; and a fixed shutter, disposed on an image surface side of said taking lens system, for determining an amount of exposure;

said fixed shutter being constituted by one blade, a marginal luminous flux restricting mask for correcting uneven exposure according to a time difference between respective points of time when said shutter starts opening and closing being disposed on a front side or rear side of said fixed shutter;

said marginal luminous flux restricting mask having such a shape that a position of an edge thereof in a direction perpendicular to an optical axis is set on a side where said fixed shutter starts opening and that said mask blocks light so as to correct respective amounts of exposure on the sides where said fixed shutter starts opening and closing on the image surface.

5. A two-focus switchable lens according to claim 4, wherein said telephoto-side lens comprises an aperture stop for defining brightness, said aperture stop being positioned between said telephoto-side lens and said fixed shutter when said telephoto-side lens is selected, said telephoto-side lens satisfying the following conditional expression (2):

$$0.15 < des/de < 0.36 \qquad (2)$$

where des is the distance between said fixed shutter and said aperture stop on an optical axis, and de is the distance between said aperture stop and the image surface on the optical axis.

\* \* \* \* \*